(12) United States Patent  
Monro (10) Patent No.: US 7,975,060 B2  
(45) Date of Patent: Jul. 5, 2011

(54) ADAPTIVE VIDEO DELIVERY (75) Inventor: Donald Martin Monro, Beckington (GB)

(73) Assignee: Ayscough Visuals LLC, Las Vegas, NV (US)

( * ) Notice: Subject to any disclaimer, the term of this patent is extended or adjusted under 35 U.S.C. 154(b) by 1232 days.

(21) Appl. No.: 10/363,448

(22) PCT Filed: Jul. 20, 2001

(86) PCT No.: PCT/GB01/03296  
§ 371 (c)(1),  
(2), (4) Date: Sep. 8, 2003

(87) PCT Pub. No.: WO02/21844  
PCT Pub. Date: Mar. 14, 2002

(65) Prior Publication Data  
US 2004/0028135 A1 Feb. 12, 2004

(30) Foreign Application Priority Data  
Sep. 6, 2000 (GB) .................................. 0021891.7

(51) Int. Cl.  
*G06F 15/16* (2006.01)

(52) U.S. Cl. ........ 709/231; 709/235; 709/233; 370/331; 375/240.16; 375/240.01; 725/1; 725/39; 725/50; 725/91

(58) Field of Classification Search ............. 375/240.16, 375/240.01; 709/231, 236, 235, 233; 370/331; 725/1, 50, 91, 93, 39  
See application file for complete search history.

(56) References Cited

U.S. PATENT DOCUMENTS

| 5,538,255 A * | 7/1996 | Barker ............................ 463/41 |
| 5,715,332 A * | 2/1998 | Nakanishi ..................... 382/232 |
| 5,850,218 A * | 12/1998 | LaJoie et al. .................... 725/45 |
| 6,157,949 A * | 12/2000 | Cheng et al. ................... 725/101 |
| 6,160,570 A * | 12/2000 | Sitnik ............................... 725/9 |
| 6,169,821 B1 * | 1/2001 | Fukunaga et al. ............. 382/239 |
| 6,295,094 B1 * | 9/2001 | Cuccia .......................... 348/559 |
| 6,314,576 B1 * | 11/2001 | Asamizuya et al. ............ 725/91 |
| 6,502,139 B1 * | 12/2002 | Birk et al. ...................... 709/233 |

(Continued)

FOREIGN PATENT DOCUMENTS  
EP 0763944 A2 3/1997  
(Continued)

OTHER PUBLICATIONS  
"Adaptive Foveation Of MPEG Video" Reeves et al., Boston, Nov. 18, 1996.

*Primary Examiner* — Thuong T Nguyen  
(74) *Attorney, Agent, or Firm* — Woodcock Washburn LLP (57) ABSTRACT

A video server for transmitting video across a network to a plurality of users includes a coder (112) which operates in response to call requests or instructions received across the network (102) from individual clients (104, 106). The server maintains in memory a series of user status records (116), one for each of the users. Each record includes, or refers to, a copy of a previous frame sent to the respective user. When the coder (112) receives a call request, it uses the previously-sent frame for that user to optimise coding the current frame that is to be sent, received from a frame grabber (110). The invention avoids the difficulties of video broadcasting while still requiring only a single instance of a video coder.

28 Claims, 3 Drawing Sheets

U.S. PATENT DOCUMENTS

| | | | |
|---|---|---|---|
| 6,510,556 B1 * | 1/2003 | Kusaba et al. | 725/93 |
| 6,553,015 B1 * | 4/2003 | Sato | 370/331 |
| 6,769,127 B1 * | 7/2004 | Bonomi et al. | 725/39 |
| 2002/0191562 A1 * | 12/2002 | Kumaki et al. | 370/331 |
| 2006/0150216 A1 * | 7/2006 | Herz et al. | 725/50 |

FOREIGN PATENT DOCUMENTS

| | | |
|---|---|---|
| EP | 0940989 A2 | 9/1999 |
| JP | 06141028 A | 5/1994 |
| JP | 07095571 A | 4/1995 |
| WO | WO 99 26415 A | 5/1999 |

* cited by examiner

ADAPTIVE VIDEO DELIVERY

This application claims the benefit of priority under U.S.C. §371 to International Application No. PCT/GB01/03296, filed on Jul. 20, 2001, which claims priority to The United Kingdom of Great Britain and Northern Ireland Patent No. 0021891.7, filed Sep. 6, 2000.

BACKGROUND

The present invention relates to adaptive video delivery, and in particular to an apparatus, system and method for supplying video images to multiple users across a network.

The satisfactory delivery of video to multiple users across a network which has no guaranteed level of service has historically been difficult to achieve. Broadcasting the video across the network is typically unsatisfactory since not all recipients will necessarily be able to handle the data at the same bit rates. Even where they could theoretically do so, different levels of congestion at different points across the network may mean that in practice the bit rate that can actually be delivered varies between recipients. Furthermore, the actual bit rate available to each recipient will normally vary with time, as the level of congestion across the network varies. The result is that users see unacceptable "gaps" or "jumps" in the video transmission.

Conventional attempts to address this problem (as used for example in the transmission of web-cam video across the internet) rely on the individual transmission to each user of a sequence of still images at a rate the user can accept. When the recipient has received the first image, a message is sent back across the internet to the web-cam server, requesting the next, and so on.

Such a method is inefficient in its use of network bandwidth, and is incapable of making use of time-dependent video compression techniques such as are used for example in motion-compensated video compression.

SUMMARY

It is an object of the present invention to provide an improved method and apparatus for the delivery of video to multiple users across a network.

It is a further objective of the invention at least to alleviate the problems mentioned above.

According to a first aspect of the present invention there is provided a video server for transmitting video across a network to a plurality of users, comprising:
(a) a video coder receiving as input a sequence of video frames, and being responsive to a call request from a user to select an image frame from the sequence, encode it and transmit it to the user;
(b) a user status record memory holding a user status record for each respective user, each record including or being indicative of a previous frame transmitted by the coder to the respective user;
the video coder being arranged to encode the said image frame utilizing information on the previous frame for the user originating the call request.

Preferably, the said image frame consists of or includes the current frame in the sequence. Unused frames, which may have gone by, are omitted and need not be coded. The coder need not deal with only one frame at once: in one embodiment, several frames are dealt with at the same time in response to a single call request.

Preferably, the user status record for each respective user includes details of the recent history of the frames which have been transmitted to the respective user. In appropriate cases, that might include for example a copy of the most recent intra-frame, details of the most recent residual frame, details of the most recent motion data, timing information such as the time of receipt of the most recent call request and the time that the request was satisfied, the expected time of receipt of the next call request, and so on. More generally, the user status record maintains whatever historical information is necessary or convenient in order for the encoder to be able to encode the next required frame efficiently. Other administrative details of the user could also be stored, for example user preferences, thereby allowing the encoder to adjust its operation, as required, to the preferences or needs of the individual users.

The previous frame (which may but need not be the most recently sent frame for that user) may be stored as part of the user status record or, alternatively, the record may include a pointer to a frame which is stored in a frame store. To reduce memory requirements, single frames within the frame store may, when necessary, have multiple pointers pointing to them.

In the preferred embodiment, the encoder includes motion estimation and motion compensation means. In such a case, the output stream for each user may include coded intra-frame data, residual data and motion data.

The coder may be arranged to send an intra-frame to each respective user after a given period, whether or not a respective call request has been received. Typically, the period will be determined individually for each user, with the periods running concurrently.

Means are preferably provided for identifying, consolidating or reconciling similar or identical user status records. The coder may then be instructed to encode once only an image for transmission to all those users corresponding to the said similar or identical records.

More generally, the server may be arranged to respond to the needs of each of its clients.

According to a further aspect of the present invention there is provided a video server for transmitting video across a network to a plurality of users, comprising:
(a) a video coder receiving as input a sequence of video frames, and being responsive to control instructions from a user to select image frames from the sequence, encode them and transmit them to the user;
(b) a user status record memory holding a user status record for each respective user, each record including information indicative of previous control instructions received by the server from the respective user;
the video coder being arranged to encode frames for the respective user utilizing the information in the user status record for that user.

The control instructions may be more sophisticated than simply asking for one frame, as many parameters that are adjustable in the coder could be directed from the client. They may thus include or comprise server and/or coder configuration instructions.

According to a further aspect of the present invention there is provided a method of transmitting video across a network to a plurality of users, comprising:
(a) maintaining a user status record for each respective user, each record including information indicative of previous control instructions received from a respective user; and
(b) encoding and transmitting frames to the respective user utilizing the information in the user status record for that user.

According to a further aspect of the invention there is provided a video delivery system comprising a video server as defined above, and a plurality of client units for receiving video transmissions from the server. The client units could be fixed or portable computers, mobile phones or the like. Each will typically have either a screen for displaying the received video, or some means of storing it.

A client unit is preferably arranged to send a call request to the video server, asking for the next frame, on completion of receipt of the previous frame. Alternatively, a client unit may issue a pre-emptive call request, for the next frame, during receipt of the previous video frame.

Means may be provided, at a node of a network between the server and at least one of the client units, for generating a call request. This allows a call request to be sent back to the server, and the server to get on with processing the next frame, while the previous frame is still completing its transmission across the final part of the network.

According to a further aspect of the present invention there is provided a method of transmitting video across a network to a plurality of users, comprising:
(a) maintaining a user status record for each respective user, each record including or being indicative of a previous frame transmitted to the respective user; and
(b) on receipt of a call request for a user, selecting a current image from a sequence of video frames, encoding it and transmitting it to the user, the encoding utilizing information on the previous frame for the user originating the call request.

According to a further aspect of the invention there is provided a method of transmitting video across a network to a plurality of users, including transmitting a control instruction from a user to a server, the control instruction being indicative of the user status; and, on receipt of the instruction by the server, selecting a current image from a sequence of video frames, encoding it and transmitting it to the said user, the encoding utilizing information contained within the control instruction.

The information may be indicative of a frame previously sent by the server to the said user, and may include a frame number, eg of the most recently-transmitted intra frame. The information may include or consists of information which has previously been sent from the server to the said user.

The invention in its various aspects provides adaptive video delivery, in an efficient way, even over communications networks having no guaranteed level of service. It provides a middle way between, on the one hand, simply broadcasting a signal to all users and, on the other, dealing with each user entirely separately and providing an individual encoder for each.

More generally, the present invention extends to methods of transmitting video using any of the apparatus features mentioned above.

The invention may be carried into practice in a number of ways and one specific embodiment will now be described, by way of example, with reference to the accompanying drawings, in which:

DETAILED DESCRIPTION

Figure 1:
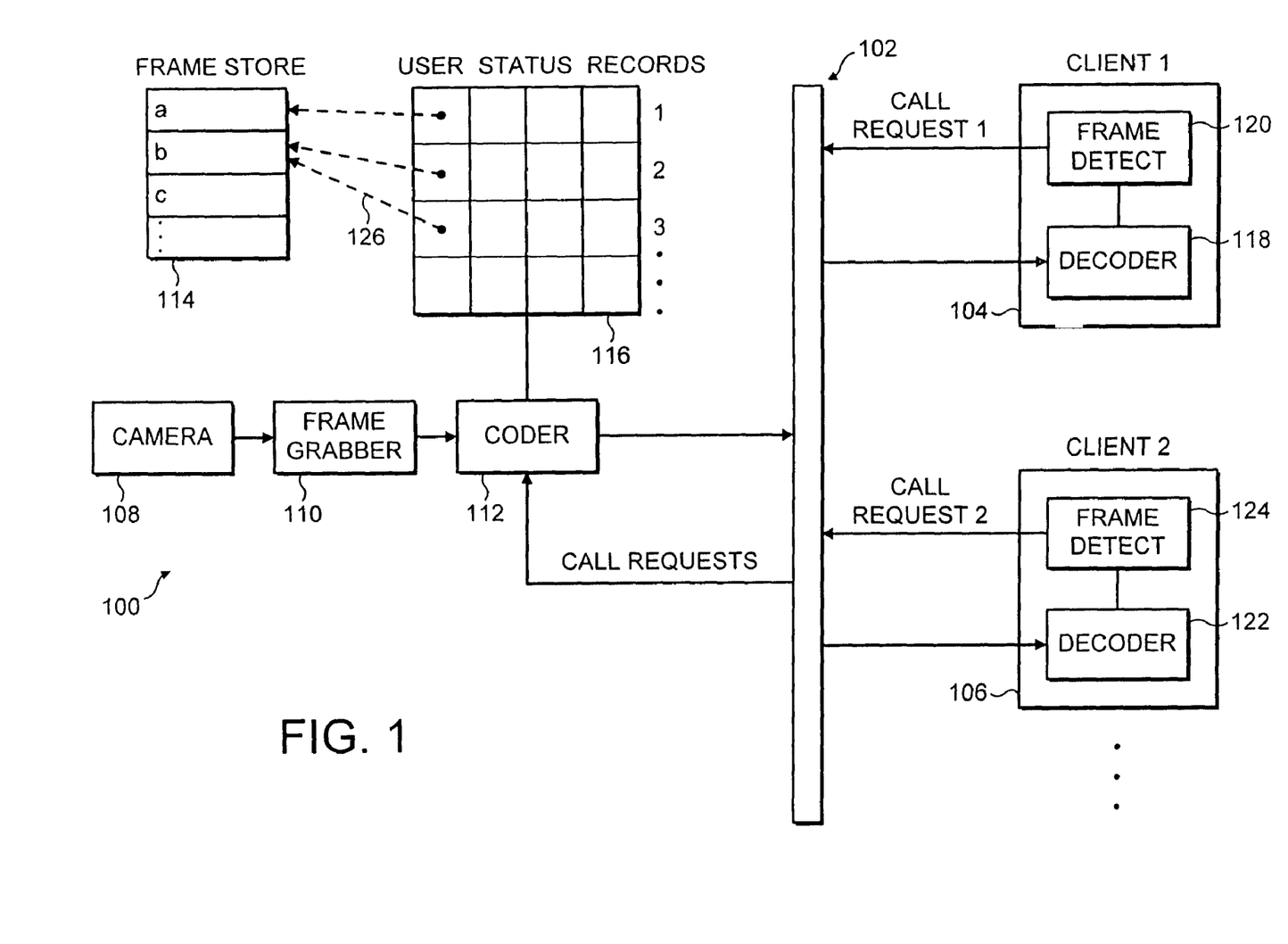
FIG. 1 shows a system for video delivery in accordance with the preferred embodiment of the present invention.

FIG. 1 shows schematically a video delivery system according to the preferred embodiment of the present invention. The system includes a server generally indicated at 100 which is arranged to supply video to a plurality of clients or users 104, 106 across a network 102.

The network 102 may be any type of network, such as a wired or wireless network. Examples include mobile phone networks, cable, PSTN, satellite, or indeed a heterogeneous network made up of components of different types possibly having different performances (such as the internet).

Typically (although not necessarily) the network will guarantee message delivery, but will not guarantee delivery time. Also, the bit rate that can be delivered across the network will not normally be guaranteed. The network may use any convenient networking protocol such as for example TCP/IP.

The clients 104, 106 may comprise fixed or mobile computers, mobile telephones or the like on which the received video is to be displayed or stored. Conventional elements such as processors, display, memory, input devices and so on are not shown in FIG. 1, for simplicity.

The server 100 includes a video camera 108, a frame grabber 110 and a coder 112 for coding the frames for transmission across the network. Alternatively, the camera and frame grabber may be replaced with some other source (not shown) of digitised video images such as an image store, or video data received in real time from elsewhere.

The coder 112 encodes the current frame, as supplied by the frame grabber 110, and sends appropriately addressed data across the network to the clients 104, 106 that the coder is aware of. A copy of the uncoded version of the image that has been sent is stored in a frame store 114. A memory 116 holds user status records, and these are updated to show that both of the clients have, in this instance, been sent a copy of the same frame.

Each client includes a respective decoder 118, 122 along with a frame detect section 120, 124 which detects when the frame has been completely received by the client. The decoder and the frame detect section are shown separately in FIG. 1, for simplicity, but in practice they may of course be combined.

When the frame detect section determines that the frame has been fully received, it issues a call request, back across the network, which is ultimately received and acted upon by the coder 112 within the server. The call request identifies the client and instructs the coder 112 to start sending the next frame.

On receipt of such a request, the coder 112 reads in the current frame in the video sequence from the frame grabber 110 and encodes the next frame for transmission to that client based not only on that frame but also upon the previous frame for that client, as stored in the frame store 114 and accessed by the information in the user status records 116. Typically, the coder may use motion estimation techniques to send motion-vector information rather than compressed still frames.

Alternatively, the image stored in the frame store, instead of being the uncoded version, might be a decoded version. Which image is to be stored will depend on whether the strategy of the encoder/compressor is to predict from uncompressed or from compressed frames (both are possible).

Each of the clients being served by the server 100 may be capable of receiving data at different rates, and those rates may vary with time as a function amongst other things of congestion on the network 102. That is of no great consequence, however, since each client is being sent motion-compensated video at an appropriate rate.

In the simplest arrangement, the frame store 114 stores one frame for each client that is being served; typically, that will be the most recent intra-frame for each client. The user status records may include details of the subsequent history for each client, for example details of the subsequently-sent residual data and motion data. In order to save storage space, an intra-frame is not stored separately for each user record; rather, a pointer 126 points to the appropriate image within the frame store 114.

In a more sophisticated arrangement, the server may attempt to consolidate or to reconcile user status records that are similar or identical. In such a case, the coder can prepare a single updated image for transmission to the clients in question, without having to code each client updated image separately. The resultant updated image is then sent twice, once addressed to the first client and once addressed to the second. Optionally, the server need not wait for both of the client requests to be received in such a case, and it may simply send both addressed images on receipt of the first request, without awaiting the second.

Figure 2:
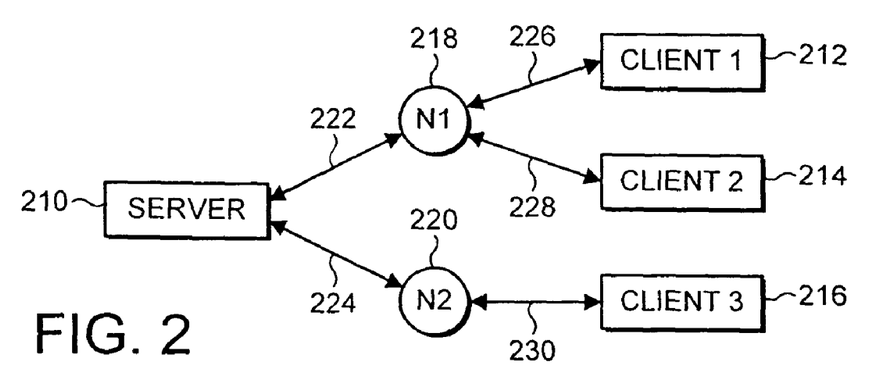
FIG. 2 shows a variation utilising intermediate nodes of the network.

A variation of the preferred embodiment, providing greater efficiency, is shown in FIG. 2. Here, a server 210 serves three clients 212, 214, 216 across the network that includes two nodes 218, 220. It will be assumed for the purposes of this illustration that the network path/channel 222 is capable only of carrying low bit rates, or is unreliable, while network paths/channels 226, 228 are capable of handling higher bit rates with high reliability.

In order to avoid having to duplicate transmissions across the path 222 to the clients 212, 214, the node N1 218 includes within it a decoder and frame detect section, similar to those shown in FIG. 1. The server directly addresses the node, and the node issues the call requests as appropriate. As the data is received, it is passed on along the paths 226, 228 to the clients 212, 214.

Similarly, the node N2 220 includes a decoder and frame detect section, allowing the node to control the call requests necessary to serve the client 216. Depending upon the bit rates available along the lines 224 and 230, the node N2 220 may issue a call request back to the server even before all of the data has been completely transmitted along the path 230 to the client 216.

In both the FIG. 1 and the FIG. 2 variations, the client or the node may when appropriate issue a pre-emptive call request—in other words it may issue the request before the previous frame has been fully received. That allows decoding of one frame to continue in parallel with the encoding and transmission of the next one by the server.

In the preferred embodiment, the coder makes use of motion-compensated compression techniques. The output stream for each of the clients thus consists of coded intra-frame data, residual data and motion data. Timing information may be recorded in the user status records 116 forcing the coder to send a new intra-frame to each of the clients after a certain lapsed interval (the length of which may vary between clients) whether or not a call request has been received. In situations where the data transfer rate is relatively constant, the server may be programmed preemptively to send the next frame to the client if the expected call request has not been received after the expected period.

The system may incorporate the ability for the client to be able to instruct the server to send a desired number of bits per pixel (producing a variable frame rate). Alternatively, the user may issue the call request at regular intervals, thereby forcing the server to work at a fixed frame rate for that user. Individual users may have differing requirements.

Note that the client is able to assess both the latency and the bit rate of the information received from the server, and could base its demands on the past and/or current performance of its channel. For example, if the latency experienced in responding to client requests is long the client might go further than preempting just one frame. It could run several frames ahead, or request a group of frames at a particular frame rate. The latency—the delay between a request being sent and data beginning to arrive—is of course ideally zero, but in practice (particularly across a WAN) it may be substantial. Thus, client may anticipate and ask for bursts of frames at a rate adapted to the current bit rate of the connection.

The call request may be more sophisticated than simply asking for one frame, as many (or all) parameters that are adjustable in the coder could be directed from the client.

The client can analyse the data coming from the server, rather than burden the server with the task of 'sounding the channels'.

More generally, the individual clients may control the server each with its own series of control instructions.

In another embodiment (not shown) the status records may be stored wholly or partly in the clients, instead of at the server. The server in such a case sends, along with each frame, information on the user status—eg something which at least partially identifies the history of the frame being sent. That information may then be 'forgotten' by the server. When requesting a next frame, the user sends back the information previously received (or at least sends some control signal which is derived from that information), thereby allowing the server to construct the next frame on the basis of the previous one.

The coder may comprise a motion-compensated coder which just requires to know the frame number of the intra-frame most recently used for motion compensation. With such a coder, the information to be transmitted may simply be the frame number.

As previously mentioned, the preferred system makes use of motion-compensated video compression. Further details of the preferred coder 112 will now be described with reference to FIG. 3. The coder may be implemented either in hardware or in software.

Figure 3:
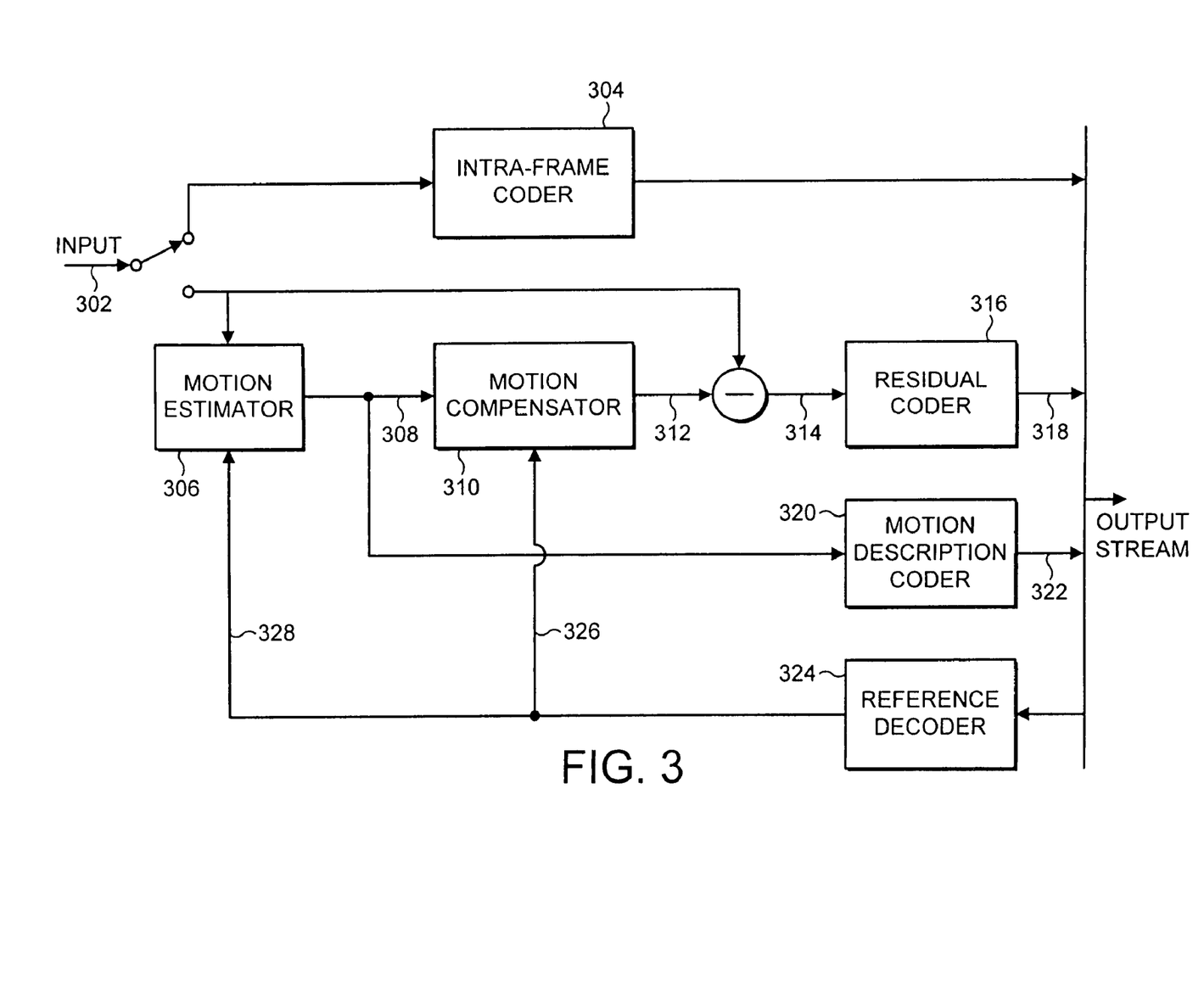
FIG. 3 shows schematically a preferred coder for use with the present invention.

Frame by frame input is applied at an input 302, with the intra-frame data being passed to an intra-frame coder 304 and the inter-frame data being passed to a motion estimator 306. The motion estimator provides the parametised motion description on line 308 which is passed to a motion compensator 310. The motion compensator outputs a predicted frame along a line 312 which is subtracted from the input frame to provide a residual frame 314 which is passed to a residual coder 316. This codes the residual frame and outputs the residual data on 318 to the output stream.

The motion description on line 308 is passed to a motion description coder 320, which codes the description and outputs motion data on a line 322.

The output stream consists of coded intra-frame data, residual data and motion data.

The output stream is fed back to a reference decoder 324 which itself feeds back a reference frame (intra or inter) along lines 326, 328 to the motion compensator and the motion estimator. In that way, the motion compensator and the motion estimator are always aware of exactly what has just been sent in the output stream. The reference decoder 324 may itself be a full decoder, for example as illustrated in FIG. 4.

Figure 4:
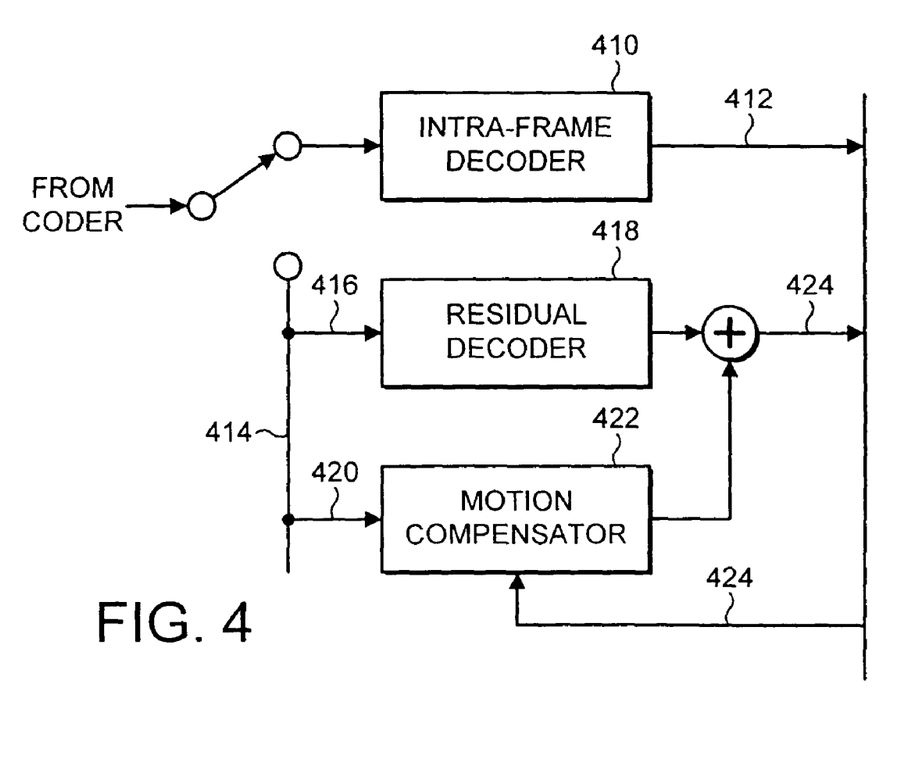
FIG. 4 shows a preferred decoder for use with the present invention.

The output stream travels across the communications network and, at the other end, is decoded by the decoder 118, 112 which is shown schematically in FIG. 4. The intra-information in the data stream is supplied to an intra-frame decoder 410, which provides decoded intra-frame information on a line 412. The inter information is supplied to a bus 414. From that bus, the residual data is transmitted along a line 416 to a residual decoder 418. Simultaneously, the motion data is supplied along a line 420 to a motion compensator 422. The outputs from the residual decoder and the motion compensator are added together to provide a decoded intra-frame on line 424.

Reference frame information is fed back along a line 424 to the motion compensator, so that the motion compensator always has current details of both the output from and the input to the decoder.

The invention claimed is:

1. A video server device for transmitting video across a network, comprising:
   a video coder receiving a sequence of video frames, the video coder receiving call requests from one or more respective recipients for transmitting one or more selected image frames from the sequence; and
   a status record memory holding a status record for each of the one or more respective recipients, each status record being indicative of one or more previous frames transmitted by the video coder to the one or more respective recipients, and each status record including information on a most recently transmitted intra-frame and residual frame for the one or more respective recipients, wherein similar status records are identified,
   the video coder configured to encode, for transmission, the one or more selected image frames, residual frame data, and intra-frame data utilizing information related to the one or more previous frames for the one or more respective recipients as indicated in the respective status record, and
   the video coder being further configured to encode once only the one or more selected image frames and the video coder transmitting the encoded one or more selected image frames, residual frame data, and intra-frame data to each of the one or more respective recipients corresponding to the identified similar status records.

2. A video server device as claimed in claim 1 in which each status record includes details of the recent history of frames which have been transmitted to the recipient.

3. A video server device as claimed in claim 1 in which each status record includes a pointer to a previous frame, stored in a frame store.

4. A video server device as claimed in claim 3 in which a single frame in the frame store may have multiple pointers pointing to it.

5. A video server device as claimed in claim 1 in which the video coder includes motion estimation and motion compensation means.

6. A video server device as claimed in claim 1 in which each status record includes details of the most recent motion data.

7. A video server device as claimed in claim 1 in which each status record includes timing information.

8. A video server device as claimed in claim 1 in which the coder is arranged to send an intra-frame to each respective recipient after a given period, whether or not a respective call request has been received.

9. A video delivery device system comprising a video server device as claimed in claim 1, and a plurality of client units for receiving video transmissions from the server.

10. A video delivery device system as claimed in claim 9 in which the client units are mobile phones.

11. A video delivery device system as claimed in claim 9 in which the video server device is arranged to transmit video to the client units across the internet.

12. A video delivery device system as claimed in claim 9 in which the client units are arranged to send a call request to the video server device on completion of receipt of a video frame.

13. A video delivery device system as claimed in claim 9 in which the client units are arranged to send a pre-emptive call request to the video server device during receipt of a video frame.

14. A video delivery device system as claimed in claim 9 including means, at a node of a network between the server device and at least one of the client units, for generating a call request.

15. A video delivery device system as claimed in claim 9, in which the client units are arranged to send a pre-emptive call request to the video server to request more than one frame in advance.

16. A method of transmitting data from a video server device across a network comprising:
   maintaining a status record for each of one or more respective recipients in a memory of the video server device, each status record being indicative of one or more previous frames transmitted to each of the one or more respective recipients, and each status record including information on a most recently transmitted intra-frame and residual frame for the one or more respective recipients;
   identifying similar status records in the memory;
   in response to a request from the one or more recipients, a video coder of the video server device selecting one or more frames from a sequence of video frames, encoding the selected one or more frames, residual frame data, and intra-frame data, the encoding utilizing information related to the one or more previous frames as indicated in the respective status record for the one or more recipients,
   the one or more selected frames being encoded once only for transmission to each of the one or more recipients corresponding to the identified similar status records; and
   transmitting the encoded one or more frames, residual frame data, and intra-frame data to each of the one or more respective recipients.

17. A method as claimed in claim 16 in which each status record includes details of the recent history of frames which have been transmitted to the recipient.

18. A method of transmitting video as claimed in claim 16 including maintaining a frame store of previous frames, each status record including a pointer to a previous frame within the frame store.

19. A method of transmitting video as claimed in claim 18 in which a single frame in the frame store may have multiple pointers pointing to it.

20. A method of transmitting video as claimed in claim 16 including encoding a current image using motion estimation and motion compensation.

21. A method as claimed in claim 16 in which each status record includes details of the most recent motion data.

22. A method as claimed in claim 16 in which each status record includes timing information.

23. A method of transmitting video as claimed in claim 16 including sending an intra-frame to each respective recipient after a given period, whether or not a respective call request has been received.

24. A method of transmitting data across a network from a video server device comprising:
   maintaining in a memory of the video server device a status record for each of one or more respective recipients, each status record being indicative of one or more previous frames sent to each of the one or more respective recipients, and each status record including information on a most recently transmitted intra-frame and residual frame for the one or more respective recipients;

identifying similar status records in the memory; and a video coder of the video server device encoding and transmitting one or more frames, residual frame data, and intra-frame data to the one or more respective recipients utilizing information in the status record for each of the one or more respective recipients, encoding once only the one or more frames for transmission to each of the one or more respective recipients corresponding to the identified similar status records.

25. The method of claim 24, in which the information in the status record for the one or more respective recipients includes details of the recent history of the one or more frames which have been transmitted to the one or more respective recipients.

26. A video server device for transmitting data across a network, comprising:

a coding means for receiving a sequence of video frames, encoding one or more image frames from the sequence of video frames and intra-frame data, and receiving requests from one or more respective recipients to select the one or more image frames; and a storage means for holding a status record for each of the one or more respective recipients, each status record being indicative of one or more previous frames transmitted by the coding means to each of the one or more respective recipients, and each status record including information on a most recently transmitted intra-frame and residual frame for the one or more respective recipients, the coding means identifying similar status records, the coding means encoding the selected one or more image frames, residual frame data, and intra-frame data utilizing information related to the one or more previous frames for each of the one or more respective recipients as indicated in the respective status record, and the coding means encoding once only the selected one or more image frames for transmission to each of the one or more respective recipients corresponding to the similar status records and transmitting the one or more image frames, residual frame data, and intra-frame data to the one or more respective recipients.

27. A method for transmitting video across a network from a video server device, comprising:

receiving a sequence of video frames, the sequence of video frames received by a video coder of the video server device;

receiving requests from one or more respective recipients to select an image frame from the sequence, the requests received by the video coder;

storing a status record for each of the one or more respective recipients in a memory of the video server device, each status record being indicative of a previous frame transmitted by the video coder to each of the one or more respective recipients, and each status record including information on a most recently transmitted intra-frame and residual frame for the one or more respective recipients;

identifying similar status records;

encoding by the video coder the selected image frame, residual frame data, and intra-frame data utilizing information related to the previous frame for each of the one or more respective recipients as indicated in the respective status record, the video coder encoding the selected image frame only once for each of the one or more respective recipients corresponding to the similar status records; and transmitting the selected image frame, residual frame data, and intra-frame data, as encoded, to each of the one or more respective recipients.

28. The method of claim 27, further comprising:

storing at least one previously transmitted frame for each of the one or more respective recipients in an image frame store memory of the video server device; and indicating a correspondence between at least one frame in the image frame store memory and a plurality of status records, the correspondence indicated with a respective plurality of pointers of the video server device.

* * * * *

UNITED STATES PATENT AND TRADEMARK OFFICE
CERTIFICATE OF CORRECTION

PATENT NO.         : 7,975,060 B2                                Page 1 of 1
APPLICATION NO.    : 10/363448
DATED              : July 5, 2011
INVENTOR(S)        : Monro It is certified that error appears in the above-identified patent and that said Letters Patent is hereby corrected as shown below:

Column 1, line 2, below Title insert -- PRIORITY DATA --.

Signed and Sealed this
Third Day of January, 2012

David J. Kappos
*Director of the United States Patent and Trademark Office*